(12) United States Patent
Antonetti et al.

(10) Patent No.: US 10,769,482 B1
(45) Date of Patent: *Sep. 8, 2020

(54) SYSTEMS AND METHODS FOR USING IMAGE ANALYSIS TO AUTOMATICALLY DETERMINE VEHICLE INFORMATION

(71) Applicant: STATE FARM MUTUAL AUTOMOBILE INSURANCE COMPANY, Bloomington, IL (US)

(72) Inventors: Joseph Antonetti, Wallingford, CT (US); Abid Imran, Champaign, IL (US); Justin Loew, Urbana, IL (US); Calvin Moon, Urbana, IL (US); Gary Foreman, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,088

(22) Filed: Feb. 22, 2019

Related U.S. Application Data

(63) Continuation of application No. 15/680,837, filed on Aug. 18, 2017, now Pat. No. 10,255,516.

(60) Provisional application No. 62/380,836, filed on Aug. 29, 2016.

(51) Int. Cl.
| | |
|---|---|
| *G06K 9/46* | (2006.01) |
| *G06K 9/62* | (2006.01) |
| *G06K 9/72* | (2006.01) |
| *G06K 9/68* | (2006.01) |

(52) U.S. Cl.
CPC ......... *G06K 9/4614* (2013.01); *G06K 9/6262* (2013.01); *G06K 9/6878* (2013.01); *G06K 9/72* (2013.01); *G06K 2209/01* (2013.01)

(58) Field of Classification Search
CPC .. G06K 9/4614; G06K 9/6878; G06K 9/6262; G06K 9/72; G06K 2209/01
See application file for complete search history.

(56) References Cited

U.S. PATENT DOCUMENTS

| | | |
|---|---|---|
| 8,340,498 B1 | 12/2012 | Gill et al. |
| 8,903,136 B1 | 12/2014 | Wang et al. |
| 2011/0103688 A1 | 5/2011 | Urbschat et al. |

(Continued)

OTHER PUBLICATIONS

Qadri et al. "Automatic Number Plate Recognition System for Vehicle Identification Using Optical Character Recognition", 2009 International Conference on Education Technology and Computer (Year: 2009).

(Continued)

*Primary Examiner* — Qian Yang
(74) *Attorney, Agent, or Firm* — Marshall, Gerstein & Borun LLP

(57) ABSTRACT

The present disclosure is directed to systems and methods for analyzing digital images to determine alphanumeric strings depicted in the digital images. An electronic device may generate a set of filtered images using a received digital image. The electronic device may also perform an optical character recognition (OCR) technique on the set of filtered images, and may filter out any of the set of filtered images according to a set of rules. The electronic device may further identify a set of common elements representative of the alphanumeric string depicted in the digital image, and determine a machine-encoded alphanumeric string based on the set of common elements.

20 Claims, 4 Drawing Sheets

(56) References Cited

U.S. PATENT DOCUMENTS

2014/0355835 A1 12/2014 Rodriguez-Serrano et al.
2016/0041987 A1 2/2016 Lapir et al.
2017/0083785 A1 3/2017 Warsawski et al.

OTHER PUBLICATIONS

Chen et al. "Text Enhancement with Asymmetric Filter for Video OCR" IEEE 0-7695-1183-X/01 (Year: 2001).
Casey et al. "A Survey of Methods and Strategies in Character Segmentation", IEEE Transactions on Pattern Analysis and Machine Intelligence, vol. 18, No. 7 (Year: 1996).

SYSTEMS AND METHODS FOR USING IMAGE ANALYSIS TO AUTOMATICALLY DETERMINE VEHICLE INFORMATION

CROSS-REFERENCE TO RELATED APPLICATIONS

This application is a continuation of U.S. patent application Ser. No. 15/680,837, filed Aug. 18, 2017, which claims priority to U.S. Patent Application Ser. No. 62/380,836, filed Aug. 29, 2016. The disclosures of these applications are fully incorporated by reference in their entireties.

FIELD

The present disclosure is directed to systems and methods for using image analysis techniques to automatically determine information associated with an insurable asset. More particularly, the present disclosure is directed to systems and methods for performing an optical character recognition (OCR) technique and related analyses on image data associated with a vehicle to automatically determine content depicted in the image data.

BACKGROUND

Entities who maintain and process accounts for individuals sometimes require accountholders to submit certain information associated with their accounts. For example, insurance companies sometimes require their policyholders to submit odometer readings for vehicles covered by insurance policies, where the insurance companies may use the odometer readings for various insurance processing and for maintaining account information. Generally, the entities must manually review and identify the relevant information and update the accounts to reflect the information.

However, these submissions and reportings may be inaccurate and/or may include information reported in a fraudulent manner. This results in inaccurate account information which can negatively impact costs for individuals. Additionally, and especially in instances of fraudulently-reported information, increased costs may be passed down to individuals.

Accordingly, there is an opportunity to analyze individual-submitted information for accuracy, such that respective accounts may be accurately updated.

SUMMARY

In an embodiment, a computer-implemented method of analyzing image data associated with a vehicle of an individual is provided. The method may include accessing a digital image depicting an alphanumeric string, generating, by a computer processor, a set of filtered digital images using the digital image, analyzing, by the computer processor, the set of filtered digital images using an optical character recognition (OCR) technique, the analyzing resulting in a set of OCR results respectively associated with the set of filtered digital images, analyzing the set of OCR results to identify a set of common elements representative of the alphanumeric string depicted in the digital image, and determining a machine-encoded alphanumeric string based on the set of common elements.

In another embodiment, a system for analyzing image data associated with a vehicle of an individual is provided. The system may include a memory storing a set of computer-executable instructions, and a processor interfacing with the memory. The processor may be configured to execute the computer-executable instructions to cause the processor to: access a digital image depicting an alphanumeric string, generate a set of filtered digital images using the digital image, analyze the set of filtered digital images using an optical character recognition (OCR) technique, the analyzing resulting in a set of OCR results respectively associated with the set of filtered digital images, analyze the set of OCR results to identify a set of common elements representative of the alphanumeric string depicted in the digital image, and determine a machine-encoded alphanumeric string based on the set of common elements.

DETAILED DESCRIPTION

The present embodiments may relate to, inter alia, analyzing image data to automatically determine content included in the image data. In some implementations, the image data may depict various information related to vehicles, such as odometer readings, license plate numbers, and/or other information. However, it should be appreciated that the image data may depict other types of information and content.

According to certain aspects, systems and methods may access or receive a digital image that is associated with a vehicle of an individual, where the digital image may depict an alphanumeric string. Additionally, the systems and methods may apply different digital image filters to the digital image to generate filtered images, and may apply an optical character recognition (OCR) technique to the filtered images. The systems and methods may determine common elements in OCR results of the filtered images and, based on the common elements as well as on any additional analysis, may determine a final OCR result that may be an estimation of the content of the alphanumeric string.

The systems and methods therefore offer numerous benefits. In particular, the systems and methods employ various digital image analysis techniques to effectively and efficiently determine the content depicted in digital images. As a result, individuals having accounts or other records with entities are afforded the benefit of being able to remotely submit digital images that are associated with their accounts. Additionally, entities who process and/or maintain the accounts are able to access individual-provided digital images that the entities may analyze in association with maintaining and processing the accounts. It should be appreciated that additional benefits are envisioned.

The systems and methods discussed herein address a challenge that is particular to policy or account management. In particular, the challenge relates to a difficulty in effectively and efficiently processing accounts based on information that is not immediately available and/or may be subject to fraudulent reporting. Conventionally, entities must trust reported information (e.g., vehicle odometer readings), or must otherwise initiate a manual effort to verify or obtain information. The systems and methods offer improved capabilities to solve these problems by employing digital image analysis techniques to determine information included in submitted digital images. Further, because the systems and methods employ the capture, analysis, and transmission of data between and among multiple devices, the systems and methods are necessarily rooted in computer technology in order to overcome the noted shortcomings that specifically arise in the realm of policy or account management. Additionally, the systems and methods enable more accurate processing of policies tied specifically to individuals.

Figure 1A:
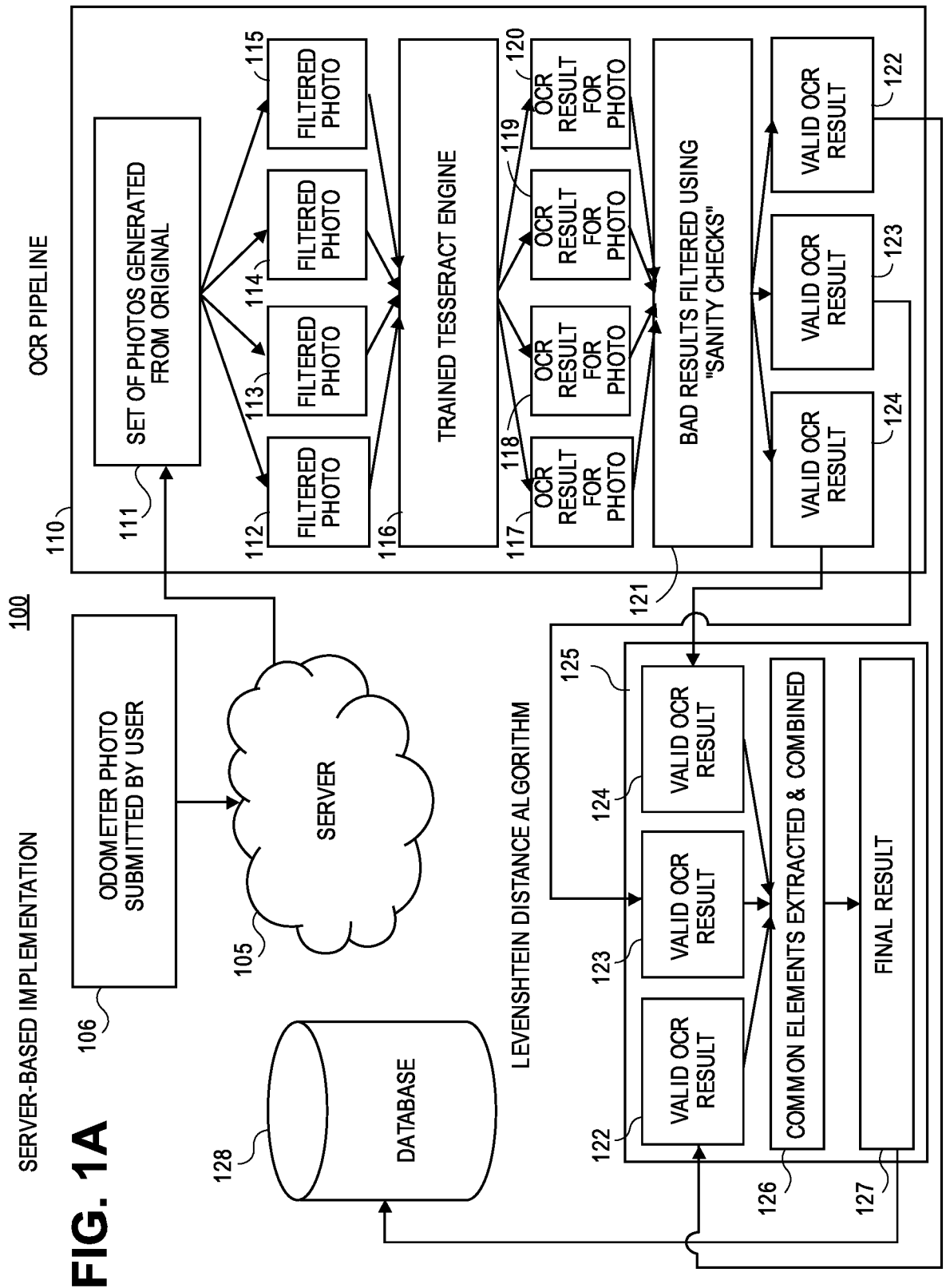
FIGS. 1A and 1B depict example implementations of image analysis components, in accordance with some embodiments.

FIG. 1A depicts an example implementation 100 of the systems and methods. The implementation 100 indicates various components, techniques, calculations, analyses, and the like that may be used in analyzing image data. The implementation 100 depicted in FIG. 1A may be a server-based implementation wherein a server 105 may be configured to receive or access digital image data, and analyze the digital image data. According to embodiments, the server 105 may include any combination of hardware and software components, centralized or distributed, and may interface or communicate with various additional entities. In a particular implementation, the server 105 may be associated with an insurance provider and may store or otherwise maintain data associated with account(s) of policyholder(s). For example, the server 105 may store automobile insurance policy information and any data related thereto, such as a premium amount, previously-submitted information (e.g., mileage information submitted by a policyholder), and/or the like.

As illustrated in FIG. 1A, the server 105 may receive (106) a digital image(s) that may be submitted by a user, such as an image of an odometer of a vehicle. In an embodiment, the server 105 may receive the digital image from an electronic device belonging to the user, where the user may be associated with the vehicle. For example, the user may be the owner or passenger of the vehicle and/or may have a vehicle insurance policy for the vehicle. The server 105 may communicate with the electronic device via any type of communication network (e.g., Bluetooth®, RFID, X10, UPnP®, IEEE 802 including Ethernet, GSM, CDMA, LTE, Internet, and/or others).

After receiving the digital image, the server 105 may perform or facilitate various processing, include a set of optical character recognition (OCR) processing steps 110. Initially, the server 105 may generate a set of filtered images 111 from the original received image. To generate each of the set of filtered images 111, the server 105 may apply a different digital effect or digital filter to the original received image. For example, the server 105 may apply a low light filter, various color filters, and/or other filters. In the example illustrated in FIG. 1A, the server 105 may generate four (4) filtered images 111: 112, 113, 114, 115. However, it should be appreciated that the server 105 may generate any number of filtered images 111 (i.e., may apply any number of digital filters to the original received image). According to an implementation, the server 105 may locally store or remotely access the digital filters.

The server 105 may input the filtered images 112-115 into an OCR engine 116. As illustrated in FIG. 1A, the OCR engine 116 may be the Tesseract OCR engine. However, it should be appreciated that other OCR engines and/or combinations of OCR engines are envisioned. In operation, the OCR engine 116 may analyze each of the filtered images 112-115 and convert any depictions of typed, handwritten, or printed alphanumeric content into machine-encoded alphanumeric content that may be stored, edited, searched, displayed, and/or the like. For example, the filtered images 112-115 may depict an odometer reading (either a mechanical odometer or an electronic odometer), where the OCR engine 116 may be configured to convert the odometer reading depicted in the filtered images 112-115 into a machine-encoded reading. Although the embodiments discussed herein describe alphanumeric content, it should be appreciated that the embodiments may analyzing and determine alternative or additional content, such as symbols, graphics, colors, and/or the like.

Generally, in generating the machine-encoded alphanumeric content from the filtered images 112-115, the OCR engine 116 may first identify or determine a machine-encoded string as well as calculate a confidence level (or similar metric) for the machine-encoded string. In some implementations, the OCR engine 116 may calculate a confidence level for each of the characters of the machine-encoded string. For example, if the OCR engine 116 determines a depicted odometer reading to be the machine-encoded string "60,812," then the OCR engine 116 may also determine that the "6" has a 80% confidence, the "0" has a 95% confidence, the "8" has a 50% confidence, the "1" has a 25% confidence, and the "2" has an 85% confidence.

The OCR engine 116 may identify or determine a machine-encoded string for each of the filtered images 112-115 (as well as any associated confidence level(s)) associated with each of the filtered images 112-115), whereby the machine-encoded string (and associated confidence level(s)) may or may not match among all of the filtered images 112-115. For example, the OCR engine 116 may determine an odometer reading depicted in the filtered image 112 to be "60,812" (with associated confidence level(s)) and may determine an odometer reading depicted in the filtered image 115 to be "65,814" (with associated confidence level(s)). Accordingly, the OCR engine 116 may output a set of OCR results 117-120 that may respectively correspond to the filtered images 112-115, wherein the OCR results 117-120 may include any determined machine-encoded string and associated confidence level(s). In some implementations, the OCR engine 116 may store the filtered images 112-115 for use in subsequent image analyses.

According to embodiments, the server 105 may access or otherwise maintain a set of rules, filters, or the like 121 that the server 105 may use to filter out any of the OCR results 117-120. In particular, the set of rules 121 may be associated with any inconsistencies, errors, or the like that may be contained within the OCR results 117-120. In applying the set of rules 121, the server 105 may compare the OCR results 117-120 to any stored data associated with a particular account or policy.

For example, if the OCR result 117 includes a determined odometer reading of 42,698 miles for a particular vehicle and the server 105 stores information that a policyholder associated with that particular vehicle previously reported an odometer reading of 51,385 miles, then the server 105 may conclude that the determined odometer reading is not possible, and may accordingly disregard the OCR result 117. For further example, if the OCR result 119 includes a determined odometer reading having nine (9) digits, then the server 105 may conclude that the determined odometer reading is invalid, as nine (9) digits may exceed an allowable amount of digits. It should be appreciated that various other rules and filters are envisioned. After the server 105 applies the set of rules 121, a set of "valid" OCR results 122-124 may remain, which may essentially be any of the OCR results 117-120 that comply with the set of rules 121.

The server 105 may analyze the valid OCR results 122-124 using one or more string metrics or algorithms 125. In the implementation 100 depicted in FIG. 1A, the string metric 125 may be the Levenshtein distance string metric, however it should be appreciated that alternative or additional string metrics are envisioned. Generally, the string metric 125 may be configured to measure an amount of difference between two sequences (i.e., an edit distance) which may quantify how dissimilar two strings are to one another by counting the minimum number of operations (e.g., insert, delete, or substitute) required to transform one string into the other.

In analyzing the valid OCR results 122-124 using the string metric(s) 125, the server 105 may output a set of common elements 126 that may be extracted and/or combined from the valid OCR results 122-124. For example, if there are nine (9) valid OCR results and seven (7) of the valid OCR results indicate that the first digit of an odometer reading is "7," then the set of common elements 126 may include an indication that the first digit of the odometer reading is "7." The server 105, in applying the string metric(s) 125 to determine set of common elements 126, may consider various threshold values, confidence levels, and/or the like that may be configurable by a user of the server 105.

The server 105 may use the set of common elements 126 to determine or calculate a final result 127. According to embodiments, the server 105 may determine the final result 127 according to the count or amount of common elements included in the set of common elements 126 and/or any confidence levels associated therewith. For example, if there are ten (1) OCR results and four of the OCR results indicate with moderate confidence that the first digit of a captured odometer reading is "3," five of the OCR results indicate with moderate confidence that the first digit of the captured odometer reading is "4," and the remaining OCR result indicates with high confidence that the first digit of the captured odometer reading is not "4," then the server 105 may deem that the first digit is "3." The server 105 may further calculate a confidence level or similar metric for the final result 127 and for any components thereof (e.g., a confidence level for each digit of an odometer reading). The server 105 may store the final result 127 in a database 128 or other memory for later access or retrieval.

Figure 1B:
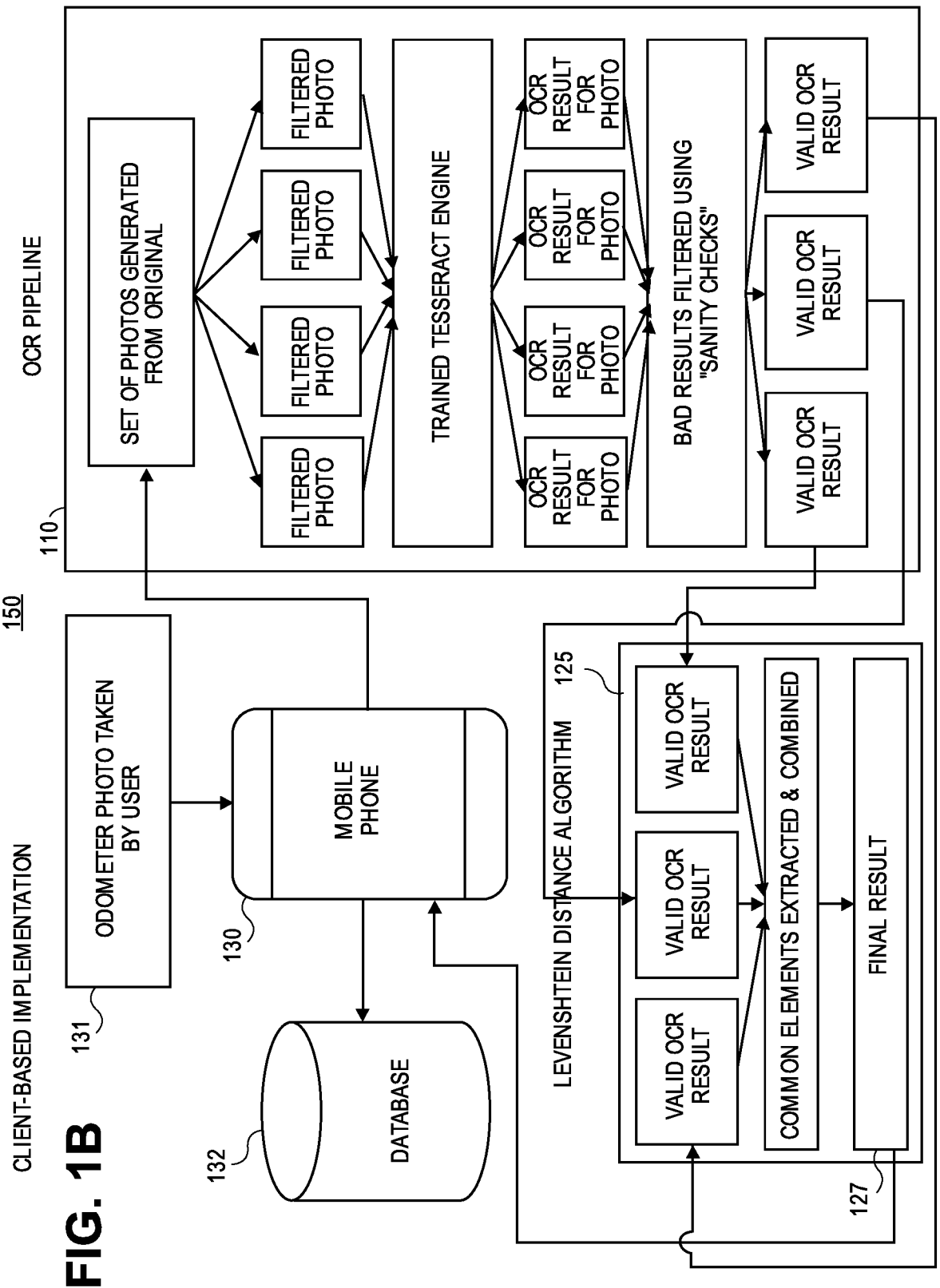

FIG. 1B depicts an additional example implementation 150 of the systems and methods. The implementation 150 is similar to the implementation 100 described with respect to FIG. 1A. However, as depicted in FIG. 1B, instead of the server 105 performing the analyses and calculations, an electronic device 130 may perform the analyses and calculations included in the OCR processing steps 110 and the string metric(s) or algorithm(s) 125. In operation, a user may use the electronic device 130 to locally capture (131) a digital image without the need for a network connection. The electronic device 130 may then perform the OCR processing steps 110 and the string metric(s) or algorithm(s) 125 on the captured digital image to ultimately determine the final result 127 for storage in a local database 132 or other memory.

It should be appreciated that the electronic device 130 may be any type of electronic device such as a smartphone, a desktop computer, a laptop, a tablet, a smart watch, smart glasses, phablet, smart contact lenses, wearable electronics, pager, personal digital assistant, or computing device configured for wireless communication. Additionally, it should be appreciated that the electronic device 103 may communicate with the server 105 via various network connections. For example, the electronic device 103 may capture digital images and transmit the captured digital images to the server 105.

Figure 2:
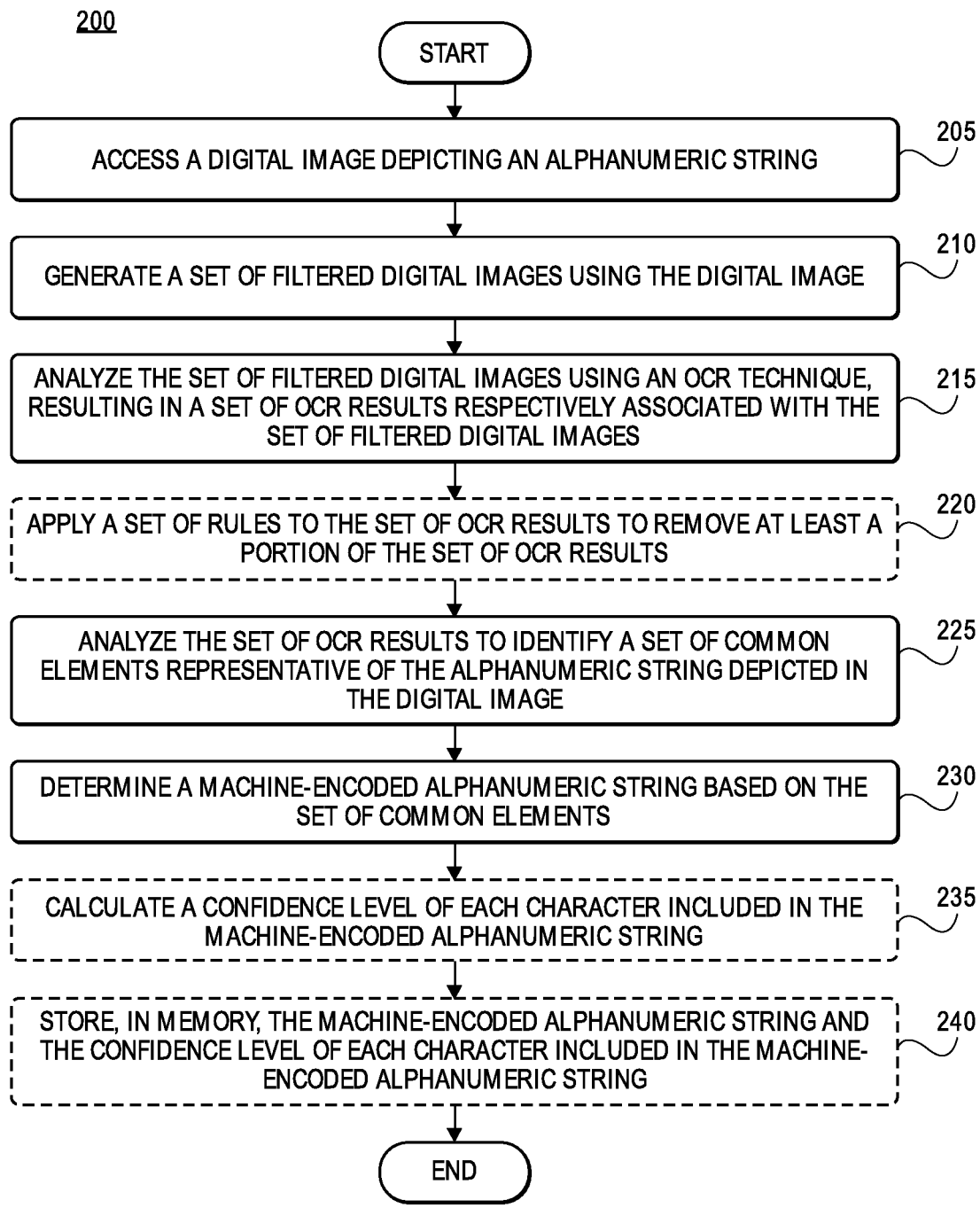
FIG. 2 depicts a flow diagram associated with analyzing image data, in accordance with embodiments.

FIG. 2 depicts a block diagram of an example method 200 of analyzing image data associated with a vehicle of an individual. The method 200 may be facilitated by an electronic device (such as the server 105 or the electronic device 130 as discussed with respect to FIGS. 1A and 1B) that may communicate with one or more memories, electronic devices, servers, or components.

The method 200 may begin when the electronic device accesses (block 205) a digital image depicting an alphanumeric string. The electronic device may access the digital image locally or may receive the digital image via a communication network. The electronic device may generate (block 210) a set of filtered digital images using the digital image. According to embodiments, the set of filtered digital images may include one or more filtered digital images, where the electronic device may apply a different digital filter to the digital image to generate a respective filtered digital image.

The electronic device may analyze (block 215) the set of filtered digital images using an OCR technique, resulting in a set of OCR results respectively associated with the set of filtered digital images. In embodiments, the electronic device may analyze the set of filtered digital images using the OCR technique to determine a preliminary machine-encoded alphanumeric string depicted in each of the set of filtered digital images, and may calculate a confidence level of each character included in the preliminary machine-encoded alphanumeric string.

The electronic device may optionally apply (block 220) a set of rules to the set of OCR results to remove at least a portion of the set of OCR results. In an implementation, the electronic device may determine, for an OCR result of the set of OCR results, that the OCR result indicates an alphanumeric string comprising a number of digits that exceeds a threshold number of digits, and may remove the OCR result from the set of OCR results. In another implementation, the electronic device may access a previously-reported metric (e.g., an odometer reading) associated with an account of the individual, compare the previously-reported metric to an OCR result of the set of OCR results to determine that content of the OCR result is not possible (e.g., the OCR result indicates an odometer reading that is less than the previously-reported odometer reading), and remove the OCR result from the set of OCR results.

The electronic device may analyze (block 225) the set of OCR results to identify a set of common elements representative of an alphanumeric string depicted in the digital image. In embodiments, the electronic device may analyze the set of OCR results using at least one string metric. The electronic device may determine (block 230) a machine-encoded alphanumeric string based on the set of common elements. In embodiments, each of the set of OCR results may include a confidence level for each character in the respective OCR result, and the electronic device may determine each character of the machine-encoded alphanumeric string based on the confidence level for each character in the respective OCR result.

The electronic device may optionally calculate (block 235) a confidence level of each character included in the machine-encoded alphanumeric string. Additionally, the electronic device may optionally store (block 240), in memory, the machine-encoded alphanumeric string and the confidence level of each character included in the machine-encoded alphanumeric string.

Figure 3:
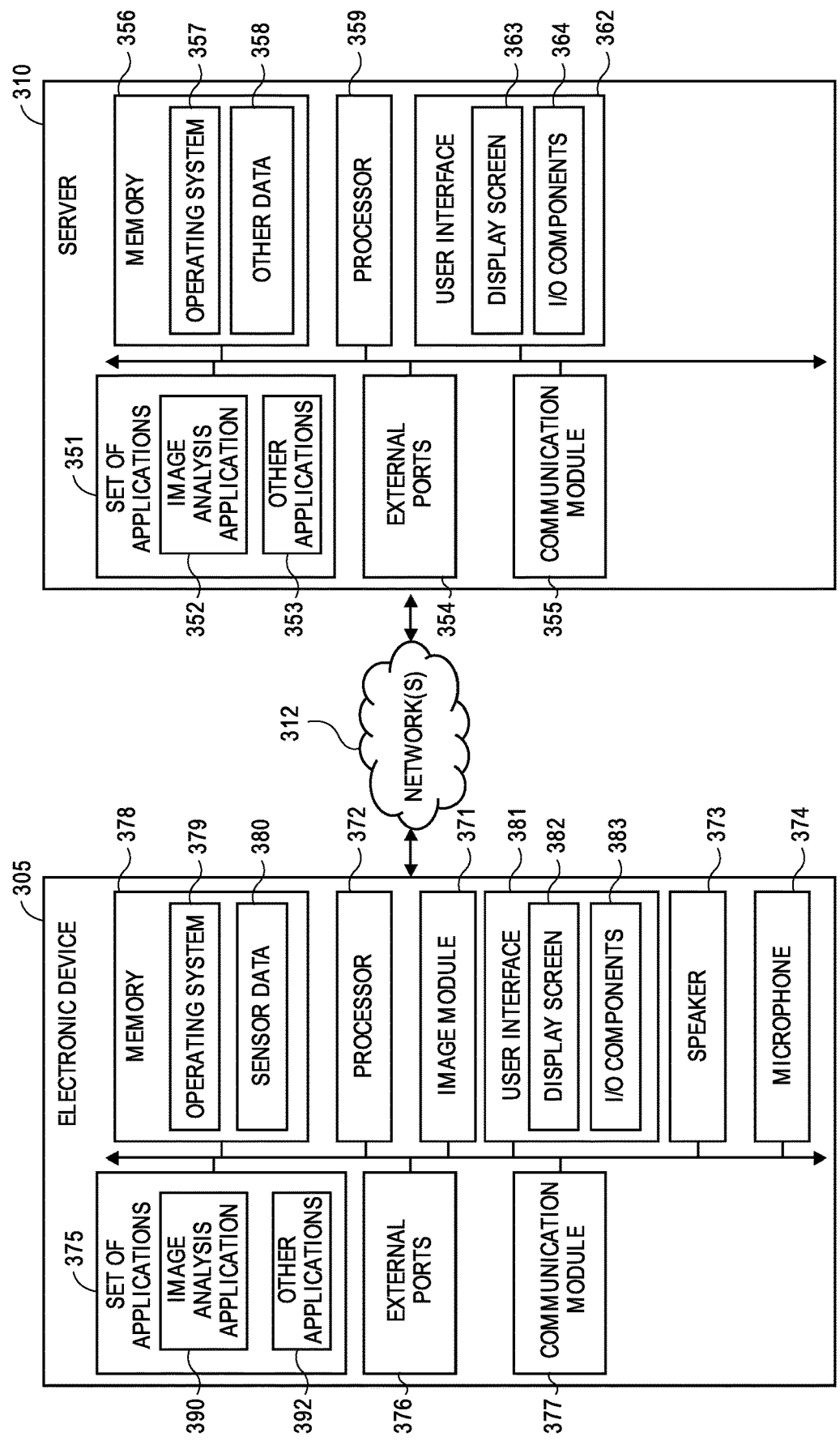
FIG. 3 is a hardware diagram of an example electronic device, in accordance with some embodiments.

FIG. 3 illustrates a hardware diagram of an example electronic device 305 (such as the electronic device 130 as discussed with respect to FIG. 1B) and an example server 310 (such as the server 105 as discussed with respect to FIG. 1A), in which the functionalities as discussed herein may be implemented. It should be appreciated that the server 310 may be associated with an entity that may issue and manage policies or accounts of individuals.

The electronic device 305 may include a processor 372 as well as a memory 378. The memory 378 may store an operating system 379 capable of facilitating the functionalities as discussed herein as well as a set of applications 375 (i.e., machine readable instructions). For example, one of the set of applications 375 may be an image analysis application 390 configured to analyze digital image data and/or other information. It should be appreciated that one or more other applications 392 are envisioned, such as an application associated with OCR and analyses associated therewith.

The processor 372 may interface with the memory 378 to execute the operating system 379 and the set of applications 375. According to some embodiments, the memory 378 may also include other data 380 including data accessed or collected from a set of sensors (e.g., digital image data). The memory 378 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 305 may further include a communication module 377 configured to communicate data via one or more networks 312. According to some embodiments, the communication module 377 may include one or more transceivers (e.g., WWAN, WLAN, and/or WPAN transceivers) functioning in accordance with IEEE standards, 3GPP standards, or other standards, and configured to receive and transmit data via one or more external ports 376. For example, the communication module 377 may interface with another device, component, or sensors via the network(s) 312 to retrieve image analysis data.

The electronic device 305 may include an image module 371, and/or one or more additional sensors such as, for example, a location module (e.g., a GPS chip), an accelerometer, a clock, a gyroscope, a compass, a yaw rate sensor, a tilt sensor, and/or other sensors. The electronic device 305 may further include a user interface 381 configured to present information to a user and/or receive inputs from the user. As shown in FIG. 3, the user interface 381 may include a display screen 382 and I/O components 383 (e.g., ports, capacitive or resistive touch sensitive input panels, keys, buttons, lights, LEDs). According to some embodiments, the user may access the electronic device 305 via the user interface 381 to review information, make selections, and/or perform other functions. Additionally, the electronic device 305 may include a speaker 373 configured to output audio data and a microphone 374 configured to detect audio.

In some embodiments, the electronic device 305 may perform the functionalities as discussed herein as part of a "cloud" network or may otherwise communicate with other hardware or software components within the cloud to send, retrieve, or otherwise analyze data.

As illustrated in FIG. 3, the electronic device 305 may communicate and interface with the server 310 via the network(s) 312. The server 310 may include a processor 359 as well as a memory 356. The memory 356 may store an operating system 357 capable of facilitating the functionalities as discussed herein as well as a set of applications 351 (i.e., machine readable instructions). For example, one of the set of applications 351 may be an image analysis application 352 configured to analyze digital image data and other information. It should be appreciated that one or more other applications 353 are envisioned, such as an application associated with OCR and analyses associated therewith.

The processor 359 may interface with the memory 356 to execute the operating system 357 and the set of applications 351. According to some embodiments, the memory 356 may also include other data 358, such as digital image data and/or other data that the set of applications 351 may access and utilize. The memory 356 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 310 may further include a communication module 355 configured to communicate data via the one or more networks 312. According to some embodiments, the communication module 355 may include one or more transceivers (e.g., WWAN, WLAN, and/or WPAN transceivers) functioning in accordance with IEEE standards, 3GPP standards, or other standards, and configured to receive and transmit data via one or more external ports 354. For example, the communication module 355 may receive, from the electronic device 305, a set of digital image data.

The server 310 may further include a user interface 362 configured to present information to a user and/or receive inputs from the user. As shown in FIG. 3, the user interface 362 may include a display screen 363 and I/O components 364 (e.g., ports, capacitive or resistive touch sensitive input panels, keys, buttons, lights, LEDs). According to some embodiments, the user may access the server 310 via the user interface 362 to review information, make changes, input data, and/or perform other functions.

In some embodiments, the server 310 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 372, 359 (e.g., working in connection with the respective operating systems 379, 357) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method of analyzing image data, the method comprising:
   generating, by a computer processor from a digital image depicting an alphanumeric string, at least two filtered digital images;
   generating, by the computer processor using an image analysis technique, at least two results respectively associated with the at least two filtered digital images and respectively indicating a set of machine-encoded strings; and
   analyzing the at least two results to identify a set of common elements indicating a machine-encoded alphanumeric string representative of the alphanumeric string depicted in the digital image.

2. The computer-implemented method of claim 1, further comprising:
   applying a set of rules to the at least two results to remove at least a portion of the at least two results.

3. The computer-implemented method of claim 2, wherein applying the set of rules to the at least two results comprises:
   determining, for a result of the at least two results, that the result indicates a string comprising a number of digits that exceeds a threshold number of digits; and
   removing the result.

4. The computer-implemented method of claim 2, wherein applying the set of rules to the at least two results comprises:
   accessing a previously-reported metric associated with an account of the individual;
   comparing the previously-reported metric to a result of the at least two results to determine that content of the result is not possible; and
   removing the result.

5. The computer-implemented method of claim 1, wherein analyzing the at least two results to identify the set of common elements comprises:
   analyzing the at least two results using at least one string metric to identify the set of common elements.

6. The computer-implemented method of claim 1, wherein generating the at least two filtered digital images comprises:
   generating a first filtered digital image by applying a first digital filter to the digital image; and
   generating a second filtered digital image by applying a second digital filter to the digital image.

7. The computer-implemented method of claim 1, wherein generating the at least two results comprises:
   determining, from each of the at least two filtered digital images using the image analysis technique, a preliminary machine-encoded alphanumeric string depicted in the respective filtered digital image.

8. The computer-implemented method of claim 7, further comprising:
   calculating a confidence level of each character included in the preliminary machine-encoded alphanumeric string.

9. The computer-implemented method of claim 1, wherein each of the at least two results includes a confidence level for each character in the respective result, and wherein the method further comprises:
   determining each character of the machine-encoded alphanumeric string based on the confidence level for each character in the respective result.

10. The computer-implemented method of claim 1, further comprising:
    calculating a confidence level of each character included in the machine-encoded alphanumeric string; and
    storing, in memory, the machine-encoded alphanumeric string and the confidence level of each character included in the machine-encoded alphanumeric string.

11. A system for analyzing image data, comprising:
    a memory storing a set of computer-executable instructions; and
    a processor interfacing with the memory, and configured to execute the computer-executable instructions to cause the processor to:
      generate, from a digital image depicting an alphanumeric string, at least two filtered digital images,
      generate, using an image analysis technique, at least two results respectively associated with the at least two filtered digital images and respectively indicating a set of machine-encoded strings, and
      analyze the at least two results to identify a set of common elements indicating a machine-encoded alphanumeric string representative of the alphanumeric string depicted in the digital image.

12. The system of claim 11, wherein the processor is configured to:
    apply a set of rules to the at least two results to remove at least a portion of the set of results.

13. The system of claim 12, wherein to apply the set of rules to the at least two results, the processor is configured to:
    determine, for a result of the at least two results, that the result indicates a string comprising a number of digits that exceeds a threshold number of digits, and
    remove the result.

14. The system of claim 12, wherein to apply the set of rules to the at least two results, the processor is configured to:
    access a previously-reported metric associated with an account of the individual, compare the previously-reported metric to a result of the at least two results to determine that content of the result is not possible, and remove the result.

15. The system of claim 11, wherein to analyze the at least two results to identify the set of common elements, the processor is configured to:

analyze the at least two results using at least one string metric to identify the set of common elements.

16. The system of claim 11, wherein to generate the at least two filtered digital images, the processor is configured to:

generate a first filtered digital image by applying a first digital filter to the digital image, and generate a second filtered digital image by applying a second digital filter to the digital image.

17. The system of claim 11, wherein to generating the at least two results, the processor is configured to:

determine, from each of the at least two filtered digital images using the image analysis technique, a preliminary machine-encoded alphanumeric string depicted in the respective filtered digital image.

18. The system of claim 17, wherein the processor is further configured to:

calculate a confidence level of each character included in the preliminary machine-encoded alphanumeric string.

19. The system of claim 11, wherein each of the at least two results includes a confidence level for each character in the respective result, and wherein the processor is further configured to:

determine each character of the machine-encoded alphanumeric string based on the confidence level for each character in the respective result.

20. The system of claim 11, wherein the processor is further configured to:

calculate a confidence level of each character included in the machine-encoded alphanumeric string, and store, in the memory, the machine-encoded alphanumeric string and the confidence level of each character included in the machine-encoded alphanumeric string.

\* \* \* \* \*